United States Patent
Baset et al.

(10) Patent No.: US 10,031,735 B2
(45) Date of Patent: Jul. 24, 2018

(54) SECURE DEPLOYMENT OF APPLICATIONS IN A CLOUD COMPUTING PLATFORM

(71) Applicant: INTERNATIONAL BUSINESS MACHINES CORPORATION, Armonk, NY (US)

(72) Inventors: Salman A. Baset, New York, NY (US); Imani N. Palmer, Champaign, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/281,367

(22) Filed: Sep. 30, 2016

(65) Prior Publication Data

US 2018/0095739 A1   Apr. 5, 2018

(51) Int. Cl.
  *G06F 9/44*   (2018.01)
  *G06F 8/60*   (2018.01)
  (Continued)

(52) U.S. Cl.
  CPC .............. *G06F 8/60* (2013.01); *G06F 8/71* (2013.01); *G06F 21/6218* (2013.01)

(58) Field of Classification Search
  CPC ........................................................ G06F 8/60
  (Continued)

(56) References Cited

U.S. PATENT DOCUMENTS

| | | | |
|---|---|---|---|
| 7,519,964 B1 * | 4/2009 | Islam | G06F 8/44 717/177 |
| 9,645,858 B2 * | 5/2017 | Winterfeldt | G06F 8/60 |

(Continued)

FOREIGN PATENT DOCUMENTS

| | | |
|---|---|---|
| EP | 1 903 741 A1 | 3/2008 |
| EP | 2 625 645 | 8/2013 |

(Continued)

OTHER PUBLICATIONS

Alan Dearle, et al., "A Flexible and Secure Deployment Framework for Distributed Applications," Component Deployment, Springer Berline Heidelberg, 2004. pp. 219-233.
http://square.github.io/keywhiz/ (last visited on Sep. 28, 2016).
https://github.com/codahale/sneaker (last visited on Sep. 28, 2016).
https://github.com/docker/docker/issues/13490 (last visited on Sep. 28, 2016).
https://www.vaultproject.io/ (last visited on Sep. 28, 2016).

(Continued)

*Primary Examiner* — Wei Zhen
*Assistant Examiner* — Lanny Ung
(74) *Attorney, Agent, or Firm* — F. Chau & Associates, LLC.

(57) ABSTRACT

A method of securely deploying an application in a cloud computing platform includes receiving component composition files that define configurations of application components included the application, and receiving an application composition file that defines a connection scheme between the application components. The method further includes retrieving default component configuration files that satisfy requirements of the application components. The method further includes executing functions corresponding to extension keywords included in the component composition files to modify default parameters in the default component configuration files, and deploying the application in the cloud computing platform based on the modified default component configuration files and the connection scheme defined by the application composition file.

17 Claims, 9 Drawing Sheets

(51) Int. Cl.
*G06F 8/71* (2018.01)
*G06F 21/62* (2013.01)
(58) Field of Classification Search
USPC .................................................. 717/114, 121
See application file for complete search history.

(56) References Cited

U.S. PATENT DOCUMENTS

| | | |
|---|---|---|
| 2008/0098453 A1 | 4/2008 | Hinton et al. |
| 2012/0222003 A1* | 8/2012 | Shukla ...................... G06F 8/10 717/115 |
| 2013/0269018 A1 | 10/2013 | Dingwall et al. |
| 2014/0283010 A1 | 9/2014 | Rutkowski et al. |
| 2015/0007274 A1 | 1/2015 | Chang et al. |
| 2015/0100459 A1* | 4/2015 | Linden ................ G06Q 30/0633 705/26.8 |
| 2015/0378765 A1* | 12/2015 | Singh .................. G06F 9/45558 718/1 |

FOREIGN PATENT DOCUMENTS

| | | |
|---|---|---|
| WO | WO 2012/047555 A2 | 4/2012 |
| WO | WO 2015/164561 A1 | 10/2015 |

\* cited by examiner

```
nginx.conf http {
server_tokens $$server_tokens
server {
  listen $$listen
  ssl_protocols $$ssl_protocols
  ssl_ciphers $$ssl_ciphers
  ssl_certificate /etc/nginx/ssl/ssl_cert.crt
  GETCERT(IP;PORT,RUN)
  root $$root
  }
}
```
— 201

```
nginx.conf-default-params $$server_tokens on
$$ssl_protocols TLSv1.2
$$ssl_ciphers !HIGH
$$ssl_certificate
$$root DEVELOPER
```
— 202

FIG. 2

NGINX

```
nginx.conf                                                    201
http {
  server_tokens $$server_tokens
  server {
    listen $$listen
    ssl_protocols $$ssl_protocols
    ssl_ciphers $$ssl_ciphers
    ssl_certificate /etc/nginx/ssl/ssl_cert.crt
    GETCERT(IP,PORT,RUN)
    root $$root
  }
}
```

```
nginx.conf-default-params
  $$server_tokens on
  $$ssl_protocols TLSv1.2
  $$ssl_ciphers !HIGH
  $$ssl_certificate
  $$root DEVELOPER                                            202
```

MYSQL

```
my.cnf                                                        301
[mysql]
max_allowed_packet $$max_allowed_packet_mysql
ssl-ca=/etc/mysql/ssl/ca.pem $@GETCA(CA,IP:PORT,RUN)
ssl-cert=/etc/mysql/ssl/client-cert.pem $@GETCERT(CACERT2, IP:PORT,RUN)
ssl-key=/etc/mysql/ssl/client-key.pem $@GETCERTKEY(CACERTKEY2,CACERT2,IP:PORT,RUN)
[mysqld]
max_allowed_packet $$max_allowed_packet_mysqld
ssl-ca=/etc/mysql/ssl/ca.pem $@GETCA(CA,IP:PORT,RUN)
ssl-cert=/etc/mysql/ssl/server-cert.pem $@GETCERT(CACERT1, IP:PORT,RUN)
ssl-key=/etc/mysql/ssl/server-key.pem $@GETCERTKEY(CACERTKEY1,CACERT1,IP:PORT,RUN)
```

```
my.cnf-default-params                                         302
  $$max_allowed_packet_mysql 16M
  $$max_allowed_packet_mysqld 16M
```

FIG. 3

BUILD NGINX - file
FROMCONF nginx_conf:latest
parameter value and artifact added by developer
ADDPARAM NGINX /etc/nginx/server/listen 443 ssl
ADDPARAM NGINX /etc/nginx/server/root
/var/www/site l/public_html ADD public_html/etc/nginx/server /var/www/sitel/public_html CMD ["nginx"]

EXPOSE 443

<u>401</u>

BUILD MYSQL - file
FROMCONF mysql_conf:latest
parameter value and artifact added by developer
ADDPARAM MYSQL /etc/mysql/my.cnf/mysqld/max_allowed_packet 20M
ADDPARAM MYSQL /etc/mysql/my.cnf/mysqld/max_connections 1000
ADDPARAM MYSQL /etc/mysql/my.cnf/mysqld/max_user_connections 1000

RUNSPECIAL MYSQL CREATE DATABASE TESTDB

CMD ["mysqld"]

EXPOSE 3306

```
nginx:
    build:nginx --secure
    expose:
    - "443"
    ports:
    - "443:443"
    nets:
    - pub I:PUB,priv I:PRIV
    slinks:
    - mysql                    501
```

```
mysql:
    build:mysql --secure
    nets:
    - priv I:PRIV
    volumes:
    - /var/lib/mysql --encrypted
                               502
```

FIG. 5

SECURE DEPLOYMENT OF APPLICATIONS IN A CLOUD COMPUTING PLATFORM

BACKGROUND

Exemplary embodiments of the present invention relate to securely deploying applications in a cloud computing platform.

Cloud computing is a type of Internet-based computing that provides shared computer processing resources and data to computers and other devices on demand. Applications may be deployed in a cloud computing platform in various ways. Currently, containers are increasingly being used to deploy applications in a cloud computing platform. A container is similar to a directory, and includes everything needed for an application to run. For example, a container may include code, runtime, system tools, system libraries, etc. Although containers may simplify the process of deploying applications in a cloud computing platform, containers do not provide an efficient way to deploy applications in a cloud computing environment in a secure manner. As a result, the burden of using containers to deploy applications in a cloud computing platform in a secure manner falls on DevOps personnel.

SUMMARY

According to an exemplary embodiment of the present invention, a computer-implemented method of securely deploying an application in a cloud computing platform includes receiving a first component composition file defining a configuration of a first application component included the application being deployed, and a second component composition file defining a configuration of a second application component included the application being deployed. The method further includes receiving an application composition file defining a connection scheme between the first and second application components. The method further includes retrieving a first default component configuration file satisfying requirements of the first application component and a second default component configuration file satisfying requirements of the second application component from a configuration service database. The method further includes executing a first function corresponding to a first extension keyword included in the first component composition file to modify a default parameter in the first default component configuration file, and a second function corresponding to a second extension keyword included in the second component composition file to modify a default parameter in the second default component configuration file. The method further includes deploying the application in the cloud computing platform based on the modified first and second default component configuration files and the connection scheme defined by the application composition file.

According to an exemplary embodiment of the present invention, a computer-implemented method of securely deploying an application in a cloud computing platform includes receiving a component composition file defining a configuration of a first application component included the application being deployed. The application being deployed includes the first application component and a second application component. The method further includes receiving an application composition file defining a connection scheme between the first and second application components. The method further includes retrieving a first default component configuration file satisfying requirements of the first application component and a second default component configuration file satisfying requirements of the second application component from a configuration service database. The method further includes executing a function corresponding to an extension keyword included in the component composition file to modify a default parameter in the first default component configuration file. The method further includes deploying the application in the cloud computing platform based on the modified first configuration file, the second default component configuration file, and the connection scheme defined by the application composition file.

According to an exemplary embodiment of the present invention, a computer-implemented method of securely deploying an application in a cloud computing platform includes receiving a first component composition file defining a configuration of a first application component included the application being deployed, and a second component composition file defining a configuration of a second application component included the application being deployed. The method further includes retrieving a first default component configuration file satisfying requirements of the first application component and a second default component configuration file satisfying requirements of the second application component from a configuration service database. The method further includes executing a first function corresponding to a first extension keyword included in the first component composition file to modify a default parameter in the first default component configuration file, and a second function corresponding to a second extension keyword included in the second component composition file to modify a default parameter in the second default component configuration file. The method further includes deploying the application in the cloud computing platform based on the modified first and second default component configuration files.

BRIEF DESCRIPTION OF THE DRAWINGS

The above and other features of the present invention will become more apparent by describing in detail exemplary embodiments thereof, with reference to the accompanying drawings, in which:

FIG. 2 shows an example of a default component configuration file stored in a configuration service of a secure deployment system according to an exemplary embodiment of the present invention.

FIG. 3 shows an example of default component configuration files used to deploy a two-tier application according to an exemplary embodiment of the present invention.

FIG. 4 shows examples of component composition files used to deploy the two-tier application of FIG. 3, according to an exemplary embodiment of the present invention.

FIG. 5 shows examples of an application composition file used to deploy the two-tier application of FIG. 3, according to an exemplary embodiment of the present invention.

DETAILED DESCRIPTION

Figure 1:
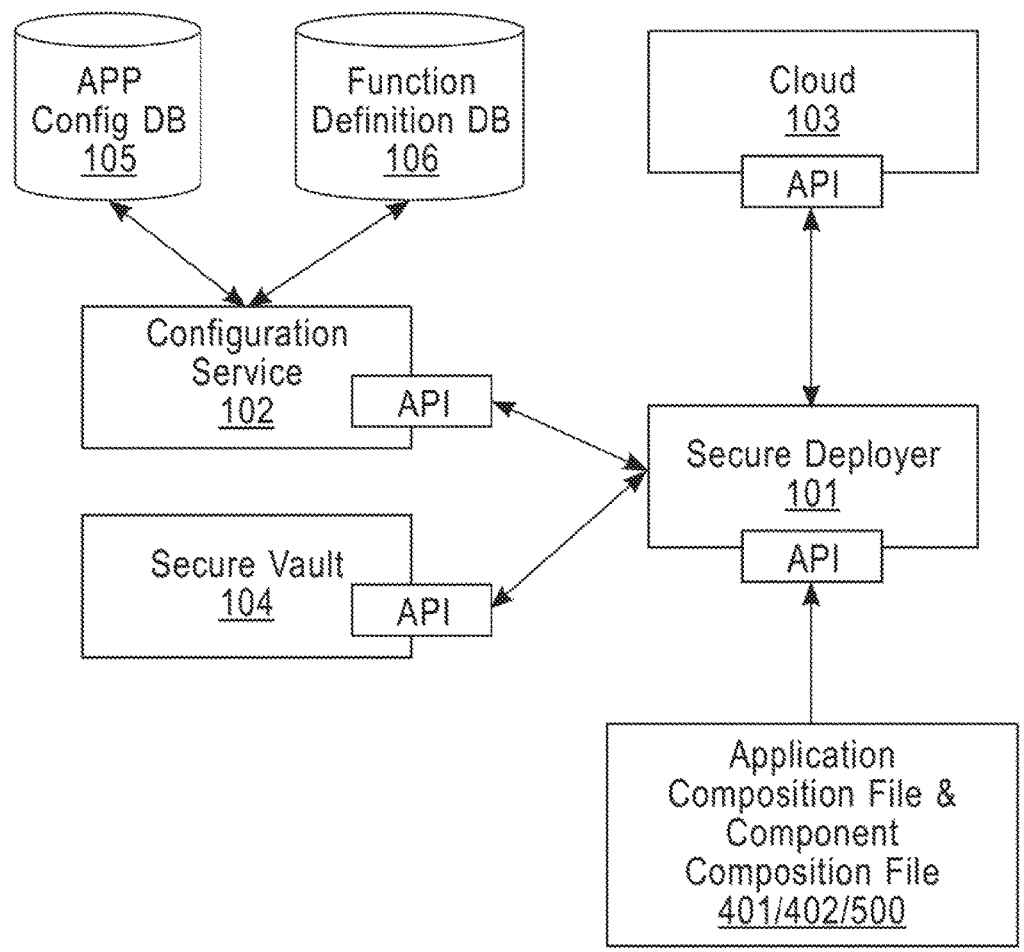
FIG. 1 is a block diagram illustrating an overview of a secure deployment system according to an exemplary embodiment of the present invention.

Exemplary embodiments of the present invention will be described more fully hereinafter with reference to the accompanying drawings. Like reference numerals may refer to like elements throughout the specification and drawings.

Exemplary embodiments of the present invention provide a method of securely deploying applications in a cloud computing platform in an automated manner. For example, according to exemplary embodiments of the present invention, tasks that are typically manually performed by a developer when securely deploying an application in a cloud computing platform such as, for example, setting up and configuring certificates, configuring administrator user accounts and permissions, performing network scans to ensure that sensitive information isn't publicly available via web server logs, etc., are automated.

FIG. 1 is a block diagram illustrating an overview of a secure deployment system according to an exemplary embodiment of the present invention.

Referring to FIG. 1, an exemplary embodiment of the present invention includes a secure deployer 101. The secure deployer 101 communicates with a configuration service 102, a cloud computing platform 103, and a secure vault 104, and a user may communicate with these components via various application programming interfaces (APIs). The secure deployer 101 receives an application composition file and/or a component composition file(s) from a user (e.g., a developer or an administrator). The application composition file and the component composition file are created by a developer and provided to the secure deployer 101. The configuration service 102 stores a plurality of parameterized secure component configuration files and function definitions (e.g., via a secure application configuration database 105 and a function definitions database 106 included in or in communication with the configuration service 102). For example, the configuration service 102 may have access to (e.g., may include or may communicate with) the secure application configuration database 105 that stores a plurality of secure component configuration files, as well as the function definitions database 106. The secure application configuration database 105 and the function definitions database 106 may be separate databases or may be included together as a single database. Herein, when data is referred to as being stored in the configuration service 102, the data is understood to be stored in the secure application configuration database 105 or the function definitions database 106. The parameterized secure component configuration files may also be referred to as default component configuration files herein.

The default component configuration files stored in the configuration service 102 correspond to various application components, which are described further below. A default component configuration file is referred to as corresponding to an application component when the default component configuration file supports/satisfies the requirements of the application component, as described further below. An application being deployed may include a single application component or multiple application components. Thus, a default component configuration file may correspond to only a part of a complete application (e.g., when the complete application includes a plurality of components, this default component configuration file may correspond to one of the plurality of components that make up the complete application), or a default component configuration file may correspond to a complete application in its entirety (e.g., when the complete application includes only a single component, this default component configuration file corresponds to the complete application). The default component configuration files may include multiple key/value pairs, in which the key is a parameter name and the value is a parameter. The value may be specified as a variable that can be overridden by a user (e.g., the developer). The configuration service 102 may further store (e.g., via the function definitions database 106) functions and their corresponding definitions, which may be specified after a value, and which may be invoked by the secure deployer 101. Herein, the terms component and application component may be used interchangeably.

The configuration service 102 provides an API that allows users to modify the contents of the configuration service 102 (e.g., the contents of the application configuration database 105 and the function definitions database 106). In addition to the developer, an administrator, who may be tasked with performing various administrative functions for managing and running the system shown in FIG. 1, may use the API to modify the contents of the configuration service 102. For example, the developer or the administrator may add, delete, or modify default component configuration files stored in the secure application configuration database 105. In this case, the developer or the administrator is typically an expert regarding the application component corresponding to the default component configuration file(s) being added, deleted or modified. For example, if the configuration file being added is for a database server, the administrator adding, deleting, or modifying the configuration file is typically a database server expert. The values of certain parameters in the default component configuration files may be specified as a variable using certain syntax (e.g., $$VARIABLE) or as a function (e.g., $$@FUNCNAME). This syntax is exemplary, and the present invention is not limited thereto. The API may further allow the developer or the administrator to query a list of supported applications and their default component configuration files, including the parameters that can be overridden and the functions that can be invoked, as well as to query a list of supported functions (e.g., a function to create and download credentials). The API may further allow the developer or the administrator to add functions that can be specified as a configuration parameter.

When using the configuration service's 102 API, the developer or administrator may define the list of parameterized parameters for a configuration file, and may store them in the configuration service 102. When defining the parameterized parameters, the developer or administrator may specify specific values for the parameters, and may define which parameter values corresponding to those values will be obtained from a network service, as well as when they will be obtained (e.g., at build or when run). The parameters that will be obtained from a network service correspond to values that can be added as part of a build or run operation. For example, "ssl_certificate/etc/nginx/ssl/ssl_cert.crt" corresponds to a certificate file that is to be added (see FIG. 2). When the values of the parameters are to be obtained from a network service, the developer or administrator may provide information identifying the network service. A developer may override the value of a configuration parameter that is added by the configuration service 102. Thus, the developer may use the configuration service's 102 API to determine (i) which parameters and corresponding values will be added by the configuration service 102, (ii) which parameters and corresponding values can be added by the developer, (iii) which parameters and corresponding values need to be downloaded from an external network service (e.g., a credential store), and (iv) which parameters and corresponding values need to be added by a developer.

FIG. 2 shows an example of a default component configuration file stored in the configuration service 102.

The default component configuration file 201 shown in FIG. 2 is an exemplary subset of a complete default component configuration file. The default component configuration file 201 shown in FIG. 2 is an application component configuration file corresponding to a web server component. For example, the default component configuration file 201 corresponds to an NGINX open source web server. It is to be understood that the default component configuration files are not limited to the example shown in FIG. 2. That is, the default component configuration files are not limited to web server components, and further, are not limited to NGINX web server components. As described above, secure configuration files may include multiple key/value pairs in which the key is a parameter name and the value is a parameter, and value variables that may be overridden by a user may be specified. In the default component configuration file 201 shown in FIG. 2, value variables that may be overridden by a user (e.g., the developer) are indicated by $$. In addition, the default component configuration file 201 shown in FIG. 2 includes a function GETCERT, which may be utilized to retrieve a certificate. The parameter IP:PORT of the function indicates the IP address and port number of the secure vault 104, and the parameter RUN of the function indicates that this certificate is to be passed to an executable application image built based on the default component configuration file 201 when it is run, not when the image is built. The variables included in the default component configuration file 201 may be initially set to default values 202. These default values 202 may be overridden by the developer.

FIG. 3 shows an example of default component configuration files used to deploy a two-tier application according to an exemplary embodiment of the present invention.

In the example shown in FIG. 3, it is assumed that the developer is deploying a two-tier application that includes two application components; a web server (e.g., an NGINX web server) and a database server (e.g., a MYSQL database server). To initiate the secure deployment process, the developer creates an application composition file and two component composition files, and provides these files to the secure deployer 101 (e.g., via the secure deployer's 101 API). Although the current example refers to a two-tier application deployment process that includes two application components, exemplary embodiments are not limited thereto. The application composition file and the component composition files are described further below with reference to FIG. 4. Once the secure deployer 101 receives the application composition file and the component composition files that define the application components to be deployed, the secure deployer 101 queries the configuration service 102 to determine whether the configuration service 102 is currently storing any default component configuration files that support the application components included in the application to be deployed. If the configuration service 102 is not currently storing a default component configuration file that support the application components (e.g., that satisfies the requirements of the application components), a message indicating this is generated and provided to the developer. Otherwise, the secure deployer 101 retrieves the default component configuration files that support the application components.

For example, in FIG. 3, the default component configuration file 201, which was described with reference to FIG. 2, supports the NGINX web server component of the developer's application, and a default component configuration file 301 supports the MYSQL database server component of the developer's application. That is, the default component configuration file 201 includes the necessary information to build an NGINX web server image (e.g., the file satisfies the requirements of the NGINX web server), and the default component configuration file 301 includes the necessary information to build a MYSQL database server image (e.g., the file satisfies the requirements of the MYSQL database server). The default component configuration file 201 and the default component configuration file 301 are identified in the configuration service 102 and retrieved from the configuration service 102 by the secure deployer 101. The secure deployer 101 may determine whether the default component configuration files 201 and 301 respectively satisfy the requirements of their corresponding application components by comparing the information included in the default component configuration files 201 and 301 with the information included in the application composition file and/or the component composition files provided to the secure deployer 101. In FIG. 3, the variables included in the default component configuration file 301 may be initially set to default values 302. These default values 302 are set by the user (e.g., the developer or the administrator) that initially created the default component configuration file 301, and may be overridden by the developer deploying the application. The keyword DEVELOPER of the default values 202 of the default component configuration file 201 indicates invocation of a network service to be added by the developer.

When a user (e.g., the developer or the administrator) determines a new application component to be deployed, the configuration service 102 may first be queried to determine whether the configuration service 102 currently stores default component configuration files needed to support the components of the new application. For example, if the application being deployed includes an NGINX web server and a MYSQL database server, the configuration service 102 is queried to determine whether configuration files capable of building images of the NGINX web server and the MYSQL database server as defined by the developer are stored in the configuration service 102. The configuration service 102 may be queried via its API. An example of a query and its corresponding response is shown below:
Request: POST/config/component=?
Response: 200 OK
<list of files and their content for a component>
If the configuration service 102 does not store the needed default component configuration file(s), the developer may add the needed default component configuration file(s) to the configuration service 102. The added default component configuration file(s) may be used by this developer, as well as by other developers deploying other applications in the future that need these application components.

The default component configuration files stored in the configuration service 102 may be added by the administrator before an application is being deployed by a developer, or by the developer at the time of deploying the application if the needed default component configuration files are not already stored in the configuration service 102, as described above. The administrator may add commonly used default component configuration files to the configuration service 102 so that they are available to developers in the future when developers are deploying applications that use the common default component configuration files. Default component configuration files may also be referred to herein as default component configuration templates.

To add a new application component that does not have a corresponding default component configuration file currently stored in the configuration service 102 to the configuration service 102, a user (e.g., the developer or the administrator) may first create a default component configuration file representing the new application component. Default variables may be assigned, and default variables that can be overridden by a developer may be specified using a certain syntax (e.g., $$VARIABLE). For certain properties in the default component configuration file, the corresponding value assigned to the properties may be a file name followed by a function invocation. In this case, the function invocation indicates to the secure deployer 101 that the specified functions are to be invoked when an image is built using the configuration file. The specific meanings of functions and their resulting functionality may be stored in the function definition database 106.

Once a default component configuration file has been created, the user that created the default component configuration file assigns a unique name to the default component configuration file, and adds it to the configuration service 102. For example, in FIG. 3, the unique name assigned to the default component configuration file 201 is nginx.conf, and the unique name assigned to the default component configuration file 301 is my.cnf. Once added to the configuration service 102, the configuration service 102 may verify the syntax, variables, and functions of the default component configuration file, and may store it therein. The administrator or developer that added the default component configuration file to the configuration service 102 may choose to make the default component configuration file publicly available to all users, privately available to only himself/herself, or available to a subset of users. When the administrator or developer makes the default component configuration file available to other users (e.g., other developers), the other developers may invoke the default component configuration file when deploying an application.

FIG. 4 shows examples of component composition files used to deploy the two-tier application of FIG. 3, according to an exemplary embodiment of the present invention.

Referring to FIG. 4, a component composition file 401 corresponding to an NGINX web server component, and a component composition file 402 corresponding to a MYSQL database server component are illustrated. As described above, an application to be deployed by a developer may include a single application component or a plurality of application components. An example of a single application component included in an exemplary application is a web server (e.g., an NGINX web server), and an example of a plurality of application components included in an exemplary application are a web server (e.g., an NGINX web server) and a database server (e.g., a MYSQL database server). It is to be understood that although exemplary embodiments in which an NGINX web server and a MYSQL database server are deployed are described herein, the NGINX web server and the MYSQL database server are exemplary, and the components utilized by applications being deployed according to exemplary embodiments of the present invention are not limited thereto.

Referring to FIGS. 3 and 4, in the present exemplary scenario, the developer is deploying a two-tier application that includes two components; an NGINX web server and a MYSQL database server. To deploy the application, the developer creates the component composition file 401 that defines the NGINX web server, and provides the component composition file 401 to the secure deployer 101 (e.g., via the secure deployer's 101 API). The developer further creates the component composition file 402 that defines the MYSQL database server, and provides the component composition file 402 to the secure deployer 101 (e.g., via the secure deployer's 101 API). The component composition files are provided by the developer to modify/override parameters of the default component configuration files corresponding to the application components being deployed by the developer. Parameters may be modified/overridden to add security and authentication functionality to the application components that would not otherwise be available without the component composition files. This process is described in further detail below.

According to exemplary embodiments of the present invention, component composition files such as the component composition files 401 and 402 are expressed/written using a component composition language. The component composition language is used to build an image of an application component that includes modifications by the developer. The component composition language according to exemplary embodiments is an extension to an existing programming language. That is, the component composition language according to exemplary embodiments is a modified version of an existing programming language that adds additional functionality (e.g., security/authentication functionality) that is not provided by the existing programming language. For example, DOCKER is an open platform that allows an application deployed to a cloud platform to be run within an isolated software container. A DOCKER container is similar to a directory, and includes everything needed for an application to run. For example, a DOCKER container may include code, runtime, system tools, system libraries, etc. A DOCKER container can be run, started, stopped, moved, and deleted. A DOCKER container is created using a DOCKER image, which is a read-only template. Instructions to create the DOCKER image are written using a text based script called Dockerfile, which allows a developer to write instructions and commands for building the image. DOCKER reads the instructions of the Dockerfile and creates the DOCKER image based on these instructions.

In exemplary embodiments of the present invention, the component composition language used to express component composition files such as the component composition files 401 and 402 is an extension to DOCKER's Dockerfile. By implementing the component composition language as an extension to Dockerfile, exemplary embodiments of the present invention may be used with DOCKER when securely deploying applications in a cloud computing platform. For example, the secure deployer 101 may receive the component composition files 401 and 402 from the developer, and may translate the files into a format decipherable by DOCKER (e.g., translate the files into a proper Dockerfile format without any language extensions). As a result, exemplary embodiments provide a way to add security and authentication features, such as the management of credentials passed between application components that are not otherwise included in existing software when utilizing the existing software alone, to securely deploy applications in a cloud computing platform. Thus, the extension adds authentication functionality not otherwise included in the existing software. Although DOCKER is referred to as the existing software in the current example, it is to be understood that exemplary embodiments of the present invention are not limited thereto. That is, exemplary embodiments may be utilized with existing software and text based scripts other than DOCKER and Dockerfile.

Referring again to FIG. 4, the bold items included in the component composition files 401 and 402 are the extensions to the existing software language, which in this case, is DOCKER's Dockerfile. These extensions may be referred to herein as extension keywords. For example, in the component composition file 401 defining the NGINX web server, the bold items "FROMCONF" and "ADDPARAM NGINX" are the extensions to Dockerfile added according to an exemplary embodiment of the present invention. In the component composition file 402 defining the MYSQL database server, the bold items "FROMCONF", "ADDPARAM MYSQL" and "RUNSPECIAL MYSQL" are the extensions to Dockerfile added according to an exemplary embodiment of the present invention. The extensions are not decipherable by DOCKER, but rather, are decipherable by the secure deployer 101. The secure deployer 101 receives the component composition files 401 and 402, deciphers the included extension keywords, and translates the component composition files 401 and 402 into an acceptable Dockerfile format that can be deciphered by DOCKER. DOCKER may then use these file to create images for the application components. As can be seen, by providing an extension to an existing software language such as DOCKER's Dockerfile, exemplary embodiments allow for an existing platform such as DOCKER to be used to create images for application components to be deployed in a cloud computing platform, in which the resulting application components include functionality that would not otherwise be available if only the existing platform was used. This functionality may include, for example, the automation of configuration credentials passed between application components, as described further below.

Referring to the component composition files 401 and 402, the bold item "FROMCONF" indicates that the NGINX web server application component and the MYSQL database server application component are to be respectively created based on the latest default NGINX and MYSQL default component configuration files as defined in the configuration service 102. The bold item "ADDPARAM" indicates that the corresponding defined parameters are being overwritten by the developer. For example, in the component composition file 401, the line "ADDIPARAM NGINX/etc/nginx/server/listen 443 ssl" indicates that the parameter as defined by "/etc/nginx/server/listen" has been overridden with the value "443 ssl." In the component composition file 402, the bold item "RUNSPECIAL" instructs the secure deployer 101 to create a database, create a username and password for accessing the database as an administrator, and to store these credentials in the secure vault 104. The credentials may then be automatically configured in application components that link to the MYSQL database server application component at build or at runtime.

If the developer provides a component composition file that defines an application component needed for the application the developer is attempting to deploy, and the configuration service 102 does not currently store a default component configuration file that supports the application component defined by the component composition file and/or does not store the needed functions to implement the application component, an appropriate message is displayed to the developer. The developer may subsequently create a default component configuration file and/or functions supporting the desired application component, and may upload the created default component configuration file to the configuration service 102 for storage, allowing it to be used by the developer or another developer in the future, as described above.

FIG. 5 shows examples of an application composition file used to deploy the two-tier application of FIG. 3, according to an exemplary embodiment of the present invention.

As described above, in addition to providing the secure deployer 101 with a component composition file(s), the developer may provide the secure deployer 101 with an application composition file. FIG. 5 shows an example of an application composition file 500 corresponding to the two-tier application deployment process described with reference to FIGS. 3 and 4. For convenience of explanation, the application composition file 500 in FIG. 5 is separated into two portions—a first portion 501 corresponding to the NGINX web server and a second portion 502 corresponding to the MYSQL database server.

Referring to FIGS. 3-5, the developer is deploying a two-tier application that includes two components; an NGINX web server and a MYSQL database server. To deploy the application, the developer creates and provides the component composition file 401 and 402 to the secure deployer 101, as described with reference to FIG. 4. The component composition file 401 defines the NGINX web server application component as needed by the developer's application, and the component composition file 402 defines the MYSQL database server application component as needed by the developer's application.

According to exemplary embodiments of the present invention, an application composition file such as the application composition file 500 is expressed/written using an application composition language. The application composition file defines the connection scheme between the various application components (e.g., the NGINX web server application component and the MYSQL database server application component in the example described above) of the application being deployed. That is, the application composition language is used to define how the application components that make up the application being deployed are connected with and communicate with one another. The application composition language according to exemplary embodiments is an extension to an existing programming language. That is, the application composition language according to exemplary embodiments is a modified version of an existing programming language. For example, as described above, DOCKER is an open platform that allows an application to be run within an isolated software container. DOCKER Compose is an open source application composition template used by DOCKER to configure an application's services.

In exemplary embodiments of the present invention, the application composition language used to express application composition files such as the application composition file 500 is an extension to DOCKER Compose. By implementing the application composition language as an extension to DOCKER Compose, exemplary embodiments of the present invention may be used with DOCKER when securely deploying applications in a cloud computing platform. For example, the secure deployer 101 may receive the application composition file 500 from the developer, and may translate the file into a format decipherable by DOCKER. As a result, exemplary embodiments provide a way to add security features not otherwise included in existing software when utilizing the existing software to securely deploy applications in a cloud computing platform. Although DOCKER is referred to as the existing software in the current example, it is to be understood that exemplary embodiments of the present invention are not limited thereto. That is, exemplary embodiments may be utilized with existing software other than DOCKER.

Referring to FIG. 5, the bold items included in the application composition file 500 are the extensions to the existing software language, which in this case, is DOCKER Compose. The extensions may also be referred to herein as extension keywords. For example, in the application composition file portion 501, the bold "build: nginx-secure" parameter specifies that the application component image for the NGINX application component is to be built with a secure configuration, as specified by the component composition file 401 defining the configuration of the NGINX application component. Further, the bold "slinks" parameter indicates that the NGINX application component securely links with the MYSQL application component. Appropriate credentials for the MYSQL component such as, for example, security credentials/certifications, are set up during runtime of the NGINX component at the appropriate paths. In the application composition file portion 502, the bold "build: mysql-secure" parameter specifies that the application component image for the MYSQL application component is to be built with a secure configuration, as specified by the component composition file 402 defining the configuration of the MYSQL application component. Further, the bold "-encrypted" item indicates than an encrypted storage device is to be used for storing the MYSQL database.

As described above, the application composition file 500 defines the connection scheme between the various application components of the application being deployed. For example, in FIG. 5, the application composition file portion 501 defines the NGINX application component's connections to other application components (e.g., to the MYSQL application component) in the application. Similarly, the application composition file portion 502 defines the MYSQL application component's connections to other application components in the application (e.g., the NGINX application component).

Referring back to FIG. 1, the secure vault 104 generates, stores, and/or retrieves identity and access management data (e.g., security credentials). The secure vault 104 may also be referred to herein as a secure vault database 104. The secure vault 104 may be accessed by the secure deployer 101 via the secure vault's 104 API, which provides for creating, storing, and retrieving security keys, certificates, and/or credentials. A key may be, for example, a public or private, or a symmetric encryption key, or an appropriate credential such as "API keys." A certificate may be, for example, an X.509 certificate.

Security credentials as discussed herein refer to security credentials used between application components of a deployed application. For example, referring to FIGS. 2-5, an NGINX web server image is built based on the component composition file 401 corresponding to the NGINX web server application component provided by the developer, and a MYSQL database server image is built based on the component composition file 402 corresponding to the MYSQL database server application component provided by the developer. An NGINX web server component and a MYSQL database server component are deployed in the cloud computing platform using these images. For the NGINX web server application component and the MYSQL database server application component to communicate properly with each other within the deployed application in the cloud computing platform, the necessary security credentials allowing these application components to interact with one another must be provided (in the event that a secure connection requiring authentication is being utilized between the application components). For example, since the application is being deployed in a secure manner, the MYSQL database server application component is an encrypted secure database. Accordingly, to access the MYSQL database server application component, the NGINX web server application component must provide the appropriate security credentials to the MYSQL database server application component to access it.

For example, when the NGINX web server application component is created based on the application component configuration file 201 of FIG. 2, the GETCERT function indicates the IP address and port number of the secure vault 104. Accordingly, the NGINX web server application component communicates with the secure vault 104 to retrieve the security credentials needed to access the MYSQL database server. These security credentials are incorporated into the NGINX web server image, either when the NGINX's web server image is built or when it is executed in the cloud computing platform.

Once images for the application components included in the application to be deployed have been built, and once the appropriate security credentials have been incorporated into the image(s), the application may be deployed in the cloud computing platform 103. Examples of cloud platform models that the application may be deployed on include, but are not limited to, an Infrastructure as a Service (IaaS) model and a Platform as a Service (PaaS) model. A cloud provider may provide secure deployment as part of its service. Alternatively, a third party may provide secure deployment of application components. In both cases, the secure deployer 101 deploys the application component image(s) in the cloud computing platform 103 using an API of the cloud computing platform 103. That is, to deploy the application component(s) in the cloud computing platform 103, the secure deployer is compatible with the cloud computing platform's 103 API. Any necessary security credentials to access the cloud platform 103 may be provided to the cloud platform 103 (e.g., by the developer) when the images are deployed. The API of the cloud computing platform 103 may be similar to an OpenStack API. The provided functionality of the API may include, for example, creating or deleting an instance, in which the instance is a bare metal machine, a virtual machine, or a container; creating or deleting a virtual network; creating or deleting an instance on a specified virtual network; and creating or deleting a storage volume (the storage volume may be encrypted by the cloud provider, for example, if an appropriate flag is passed to it).

Although the exemplary embodiment described above with reference to FIGS. 3 to 5 refers to an example in which the secure deployer 101 receives an application composition file and two component composition files, exemplary embodiments of the present invention are not limited thereto. For example, according to exemplary embodiments, the secure deployer 101 may receive, (i) only an application composition file, (ii) an application composition file and only one component composition file, (iii) an application composition file and more than two component composition files, or (iv) only one or more component composition files without an application composition file. In these different scenarios, default component configuration files and configurations may be used without further modification by the developer as needed.

Figure 6:
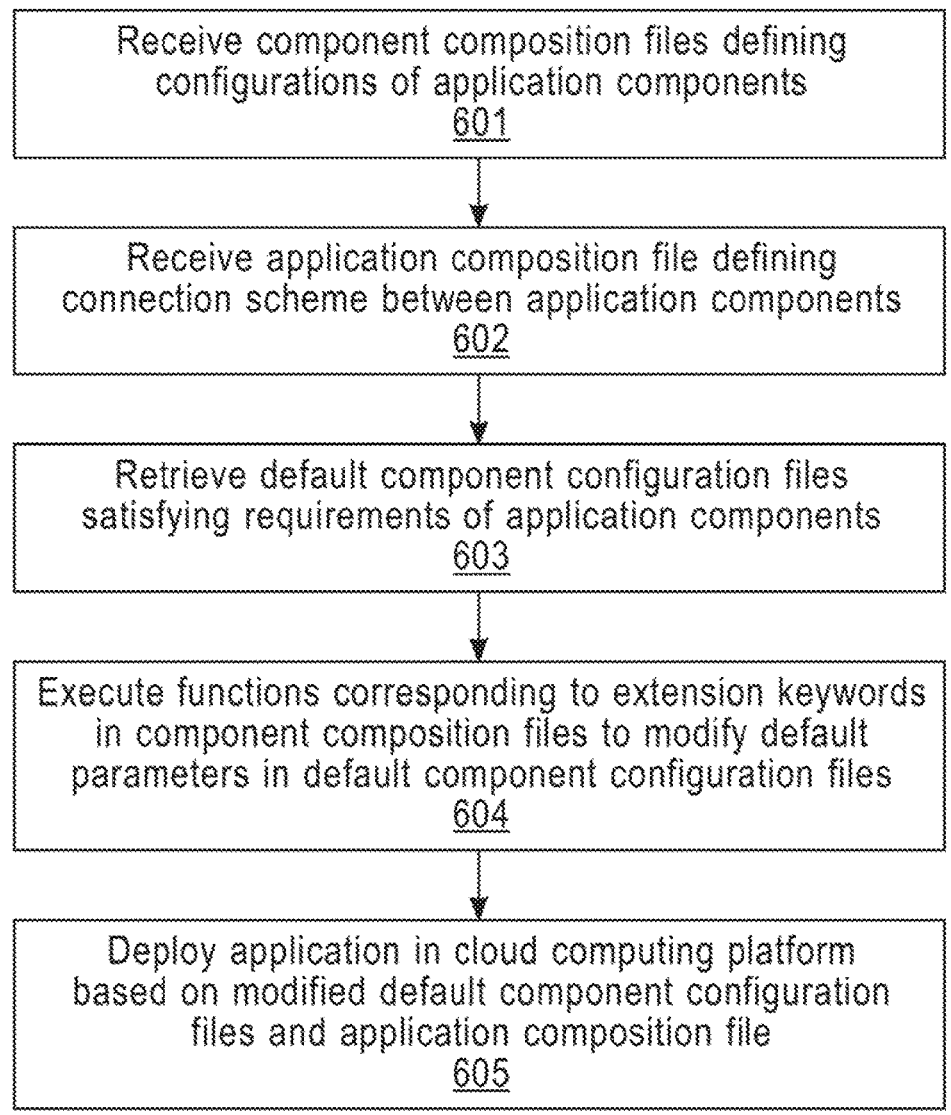
FIG. 6 is a flowchart illustrating a method of securely deploying an application in a cloud computing platform, according to an exemplary embodiment of the present invention.

FIG. 6 is a flowchart illustrating a computer-implemented method of securely deploying an application in a cloud computing platform, according to an exemplary embodiment of the present invention.

Referring to FIG. 6, at block 601, a first component composition file defining the configuration of a first application component included the application being deployed, and a second component composition file defining the configuration of a second application component included the application being deployed, are received by the secure deployer 101. The first and second component composition files may respectively be the first and second component composition files 401 and 402 corresponding to the NGINX web server and the MYSQL database server described above.

As described above, the first and second component composition files may be written using a component composition language. The component composition language is an extension to an existing cloud deployment programming language that adds authentication functionality to the existing cloud deployment programming language. The existing cloud deployment programming language may be compatible with a variety of cloud deployment platform languages including, for example, the DOCKER cloud deployment platform language. The DOCKER cloud deployment platform language may be Dockerfile.

At block 602, an application composition file defining the connection scheme between the first and second application components may be received by the secure deployer 101. The application composition file may be, for example, the application composition file 500 shown in FIG. 5.

As described above, the application composition file may be written using an application composition language. The application composition language is an extension to an existing cloud deployment programming language that adds authentication functionality to the existing cloud deployment programming language. The existing cloud deployment programming language may be compatible with a variety of cloud deployment platform languages including, for example, the DOCKER cloud deployment platform language. The DOCKER cloud deployment platform language may be DOCKER Compose.

At block 603, a first default component configuration file satisfying requirements of the first application component, and a second default component configuration file satisfying requirements of the second application component, may be retrieved from the configuration service database 105 by the secure deployer 101. The first and second default component configuration files may be, for example, the first and second default component configuration files 201 and 301 described above.

At block 604, a first function corresponding to a first extension keyword included in the first component composition file is executed to modify a default parameter in the first default component configuration file. In addition, a second function corresponding to a second extension keyword included in the second component composition file is executed to modify a default parameter in the second default component configuration file.

At block 605, the application is deployed in the cloud computing platform based on the modified first and second default component configuration files and the connection scheme defined by the application composition file. In exemplary embodiments, the application may be deployed by building a first executable application image corresponding to the first application component using the modified first default configuration file, and building a second executable application image corresponding to the second application component using the modified second default configuration file. The first and second executable application images may then be deployed in the cloud computing platform.

In exemplary embodiments, executing the first function corresponding to the first extension keyword may include retrieving security credentials allowing access to the second application component from a secure vault database, and incorporating the security credentials into the first executable application image when building the first executable application image. For example, a database server application component may require certain security credentials to be entered before access is granted to the database server application component. These credentials may be stored in the secure vault 104. When deploying a web server application component that needs access to the database server application component, an extension keyword (e.g., such as "ADDPARAM" as described above) may be utilized to execute a function causing the retrieval of the appropriate security credentials allowing access to the database server application component from the secure vault 104. These security credentials may be retrieved and incorporated into the executable application image corresponding to the web server application component when building the executable application image. Alternatively, these security credentials may be retrieved and passed to a running instance of the web server application component after the application image corresponding to the web server application component has been deployed.

As described above, the extension keywords are not decipherable by an existing cloud deployment language (e.g., such as DOCKER). Thus, the component composition files provided to the secure deployer 101 by the developer include a portion of code that is not decipherable by the existing cloud deployment programming language (e.g., the extension keyword(s)), and a portion of code that is decipherable by the existing cloud deployment programming language (e.g., the remaining code).

Although the exemplary embodiment described with reference to FIG. 6 illustrates an application being deployed in a cloud computing platform by providing the secure deployer 101 with one application composition file and two component composition files, exemplary embodiments of the present invention are not limited thereto. For example, although only two component composition files were described with reference to the deployment process of FIG. 6 for convenience of explanation, an application including a larger number of application components may be deployed. In this case, a larger number of corresponding component composition files may be provided to the secure deployer 101. Further, in exemplary embodiments, component composition files may be provided for some, but not all of the application components included in an application to be deployed. In this case, default component configuration files retrieved from the secure application configuration database 105 may be used (e.g., without modification) for the application components for which component composition files were not provided.

Figure 7:
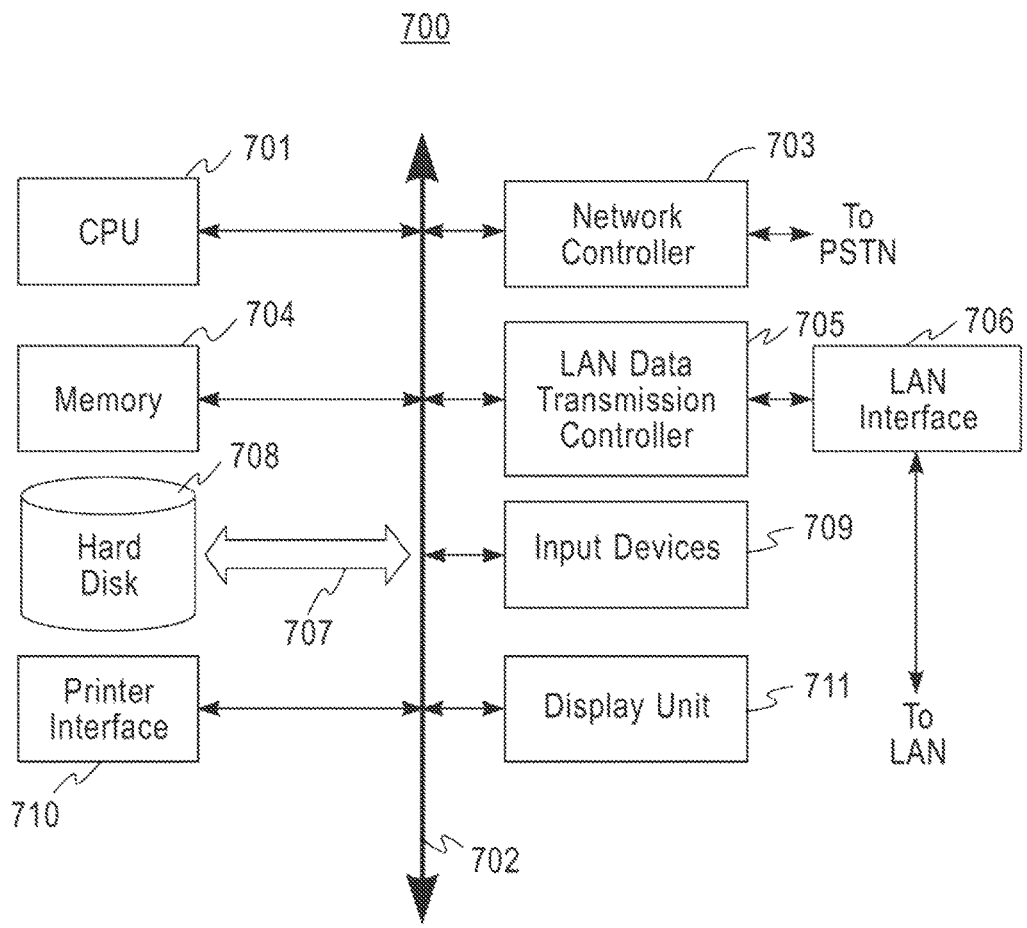
FIG. 7 illustrates an example of a computer system capable of implementing the methods according to exemplary embodiments of the present invention.

FIG. 7 illustrates an example of a computer system capable of implementing the methods according to exemplary embodiments of the present invention.

The system and method of the present invention may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 700 may include, for example, a central processing unit (CPU) 701, random access memory (RAM) 704, a printer interface 710, a display unit 711, a local area network (LAN) data transmission controller 705, a LAN interface 706, a network controller 703, an internal bus 702, and one or more input devices 709, for example, a keyboard, mouse etc. As shown, the system 700 may be connected to a data storage device, for example, a hard disk, 708 via a link 707.

Figure 8:
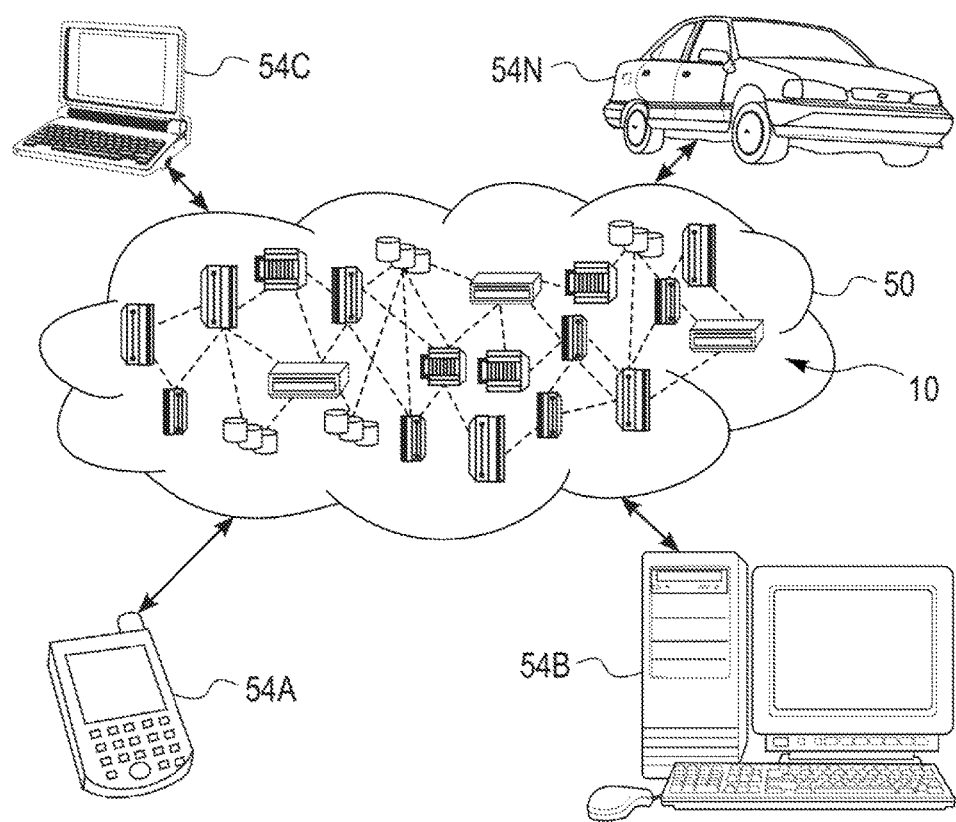
FIG. 8 depicts a cloud computing environment according to an exemplary embodiment of the present invention.
Figure 9:
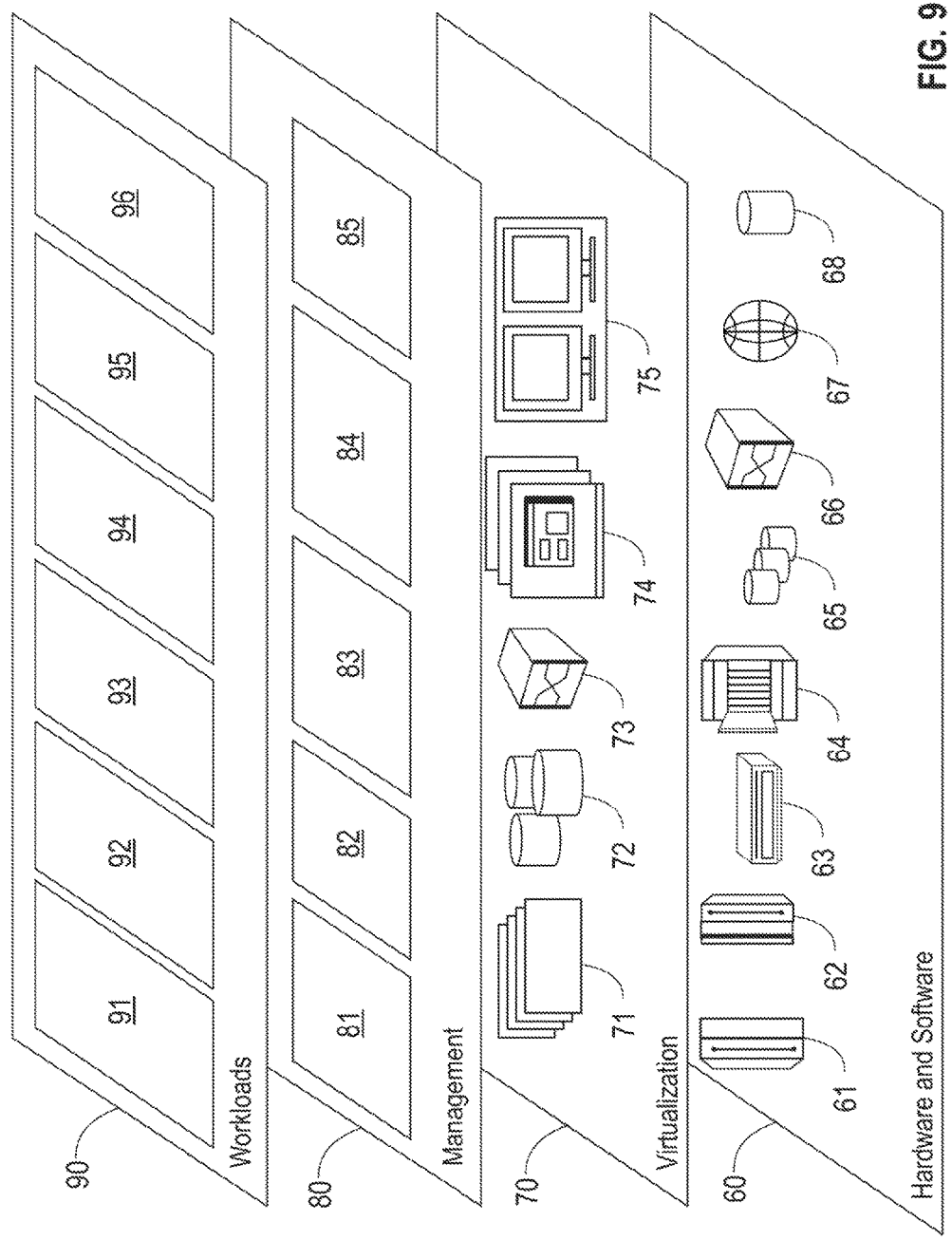
FIG. 9 depicts abstraction model layers according to an exemplary embodiment of the present invention.

FIG. 8 depicts a cloud computing environment according to an exemplary embodiment of the present invention. FIG. 9 depicts abstraction model layers according to an exemplary embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some exemplary embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to exemplary embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various exemplary embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, exemplary embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and exemplary embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some exemplary embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a voice command analysis module 96, which may perform, for example. NLP, as discussed above in more detail.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A computer-implemented method of securely deploying an application in a cloud computing platform, comprising:
   receiving a first component composition file defining a configuration of a first application component included the application being deployed, and a second component composition file defining a configuration of a second application component included the application being deployed;
   receiving an application composition file defining a connection scheme between the first and second application components,
   wherein the application composition file is written using an application composition language, and the application composition language is an extension to an existing cloud deployment programming language that adds authentication functionality to the existing cloud deployment programming language;
   retrieving a first default component configuration file satisfying requirements of the first application component and a second default component configuration file satisfying requirements of the second application component from a configuration service database;
   executing a first function corresponding to a first extension keyword included in the first component composition file to modify a default parameter in the first default component configuration file, and a second function corresponding to a second extension keyword included in the second component composition file to modify a default parameter in the second default component configuration file; and
   deploying the application in the cloud computing platform based on the modified first and second default component configuration files and the connection scheme defined by the application composition file.

2. The computer-implemented method of claim 1, wherein deploying the application in the cloud computing platform comprises:
   building a first executable application image corresponding to the first application component using the modified first default component configuration file, and a second executable application image corresponding to the second application component using the modified second default component configuration file; and
   deploying the first and second executable application images in the cloud computing platform.

3. The computer-implemented method of claim 2, wherein executing the first function corresponding to the first extension keyword comprises:
   retrieving security credentials allowing access to the second application component from a secure vault database; and
   incorporating the security credentials into the first executable application image when building the first executable application image.

4. The computer-implemented method of claim 2, wherein executing the first function corresponding to the first extension keyword comprises:
   retrieving security credentials allowing access to the second application component from a secure vault database; and
   passing the security credentials to a running instance of the first application component after the first executable application image has been deployed.

5. The computer-implemented method of claim 1, wherein
   the first extension keyword is not decipherable by the existing cloud deployment programming language, and a remaining portion of the first component composition file other than the first extension keyword is decipherable by the existing cloud deployment programming language, and
   the second extension keyword is not decipherable by the existing cloud deployment programming language, and a remaining portion of the second component composition file other than the second extension keyword is decipherable by the existing cloud deployment programming language.

6. The computer-implemented method of claim 5, wherein the existing cloud deployment programming language is compatible with a DOCKER cloud deployment platform language.

7. The computer-implemented method of claim 6, wherein the DOCKER cloud deployment platform language is Dockerfile.

8. The computer-implemented method of claim 1, wherein the first and second component composition files are written using a component composition language, and the component composition language is an extension to the existing cloud deployment programming language that adds authentication functionality to the existing cloud deployment programming language.

9. The computer-implemented method of claim 8, wherein the existing cloud deployment programming language is compatible with a DOCKER cloud deployment platform language.

10. The computer-implemented method of claim 9, wherein the DOCKER cloud deployment platform language is Dockerfile.

11. The computer-implemented method of claim 1, wherein the existing cloud deployment programming language is compatible with a DOCKER cloud deployment platform language.

12. The computer-implemented method of claim 11, wherein the DOCKER cloud deployment platform language is DOCKER Compose.

13. The computer-implemented method of claim 1, wherein the first application component is a web server and the second application component is a database server.

14. The computer-implemented method of claim 13, wherein the web server is an NGINX web server and the database server is a MYSQL database server.

15. A computer-implemented method of securely deploying an application in a cloud computing platform, comprising:
   receiving a component composition file defining a configuration of a first application component included the application being deployed, wherein the application being deployed comprises the first application component and a second application component;
   receiving an application composition file defining a connection scheme between the first and second application components;
   retrieving a first default component configuration file satisfying requirements of the first application component and a second default component configuration file satisfying requirements of the second application component from a configuration service database;
   executing a function corresponding to an extension keyword included in the component composition file to modify a default parameter in the first default component configuration file; and
   deploying the application in the cloud computing platform based on the modified first default component configuration file, the second default component configuration file, and the connection scheme defined by the application composition file,
   wherein deploying the application in the cloud computing platform comprises:
      building a first executable application image corresponding to the first application component using the modified first default component configuration file, and a second executable application image corresponding to the second application component using the second default component configuration file; and
      deploying the first and second executable application images in the cloud computing platform,
   wherein executing the first function corresponding to the first extension keyword comprises:
      retrieving security credentials allowing access to the second application component from a secure vault database; and
      incorporating the security credentials into the first executable application image when building the first executable application image.

16. A computer-implemented method of securely deploying an application in a cloud computing platform, comprising:
   receiving a first component composition file defining a configuration of a first application component included the application being deployed, and a second component composition file defining a configuration of a second application component included the application being deployed,
   wherein the first and second component composition files are written using a component composition language, and the component composition language is an extension to an existing cloud deployment programming language that adds authentication functionality to the existing cloud deployment programming language;
   retrieving a first default component configuration file satisfying requirements of the first application component and a second default component configuration file satisfying requirements of the second application component from a configuration service database;
   executing a first function corresponding to a first extension keyword included in the first component composition file to modify a default parameter in the first default component configuration file, and a second function corresponding to a second extension keyword included in the second component composition file to modify a default parameter in the second default component configuration file; and
   deploying the application in the cloud computing platform based on the modified first and second default component configuration files.

17. The computer-implemented method of claim 16, wherein deploying the application in the cloud computing platform comprises:
   building a first executable application image corresponding to the first application component using the modified first default component configuration file, and a second executable application image corresponding to the second application component using the modified second default component configuration file; and
   deploying the first and second executable application images in the cloud computing platform,
   wherein executing the first function corresponding to the first extension keyword comprises:
   retrieving security credentials allowing access to the second application component from a secure vault database; and
   incorporating the security credentials into the first executable application image when building the first executable application image.

* * * * *